Oct. 30, 1956 R. H. ZEILMAN 2,768,843
MULTIPLE PASSAGE FLUID COUPLING FOR POWER
STEERING OF CRANES AND THE LIKE
Filed June 5, 1953
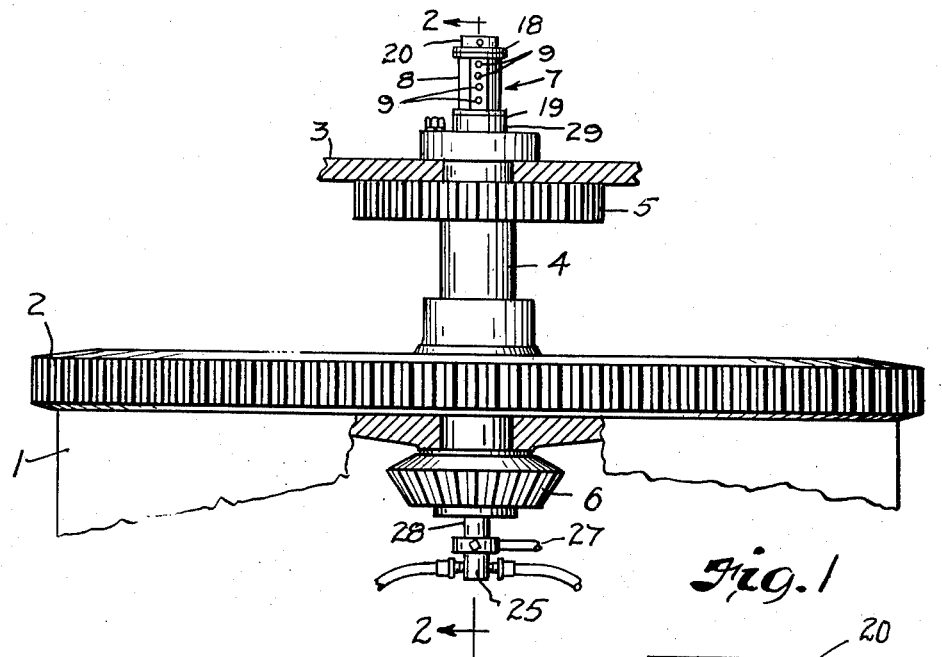
Fig. 1
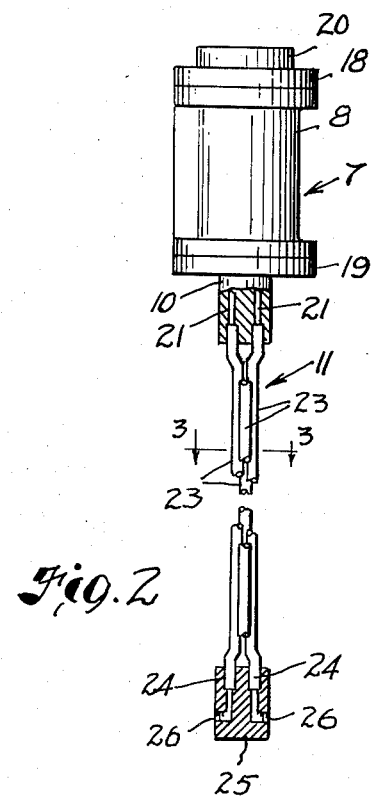
Fig. 2
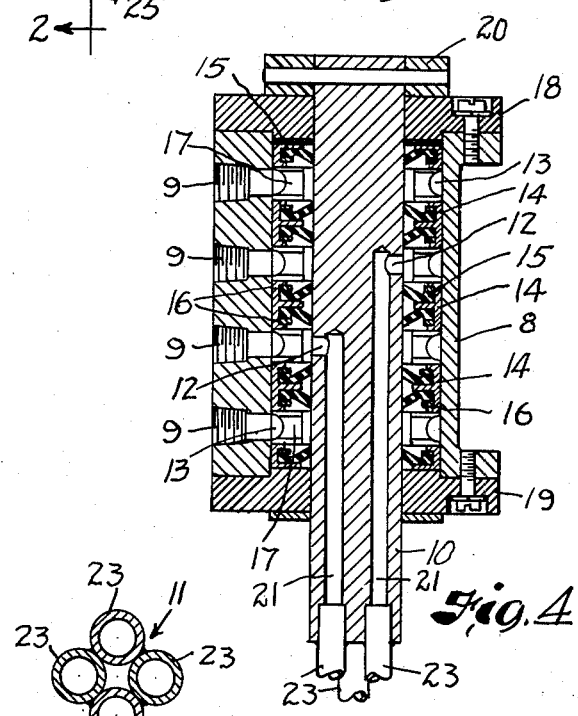
Fig. 3
Fig. 4
BY
Oberlin & Limbach
ATTORNEYS.

United States Patent Office 2,768,843
Patented Oct. 30, 1956

2,768,843

MULTIPLE PASSAGE FLUID COUPLING FOR POWER STEERING OF CRANES AND THE LIKE

Roy H. Zeilman, Elyria, Ohio, assignor to The Thew Shovel Company, Lorain, Ohio, a corporation of Ohio Application June 5, 1953, Serial No. 359,781

2 Claims. (Cl. 285—137)

The present invention, while indicated as relating to a fluid coupling for power steering of cranes and the like, more generally relates simply to a fluid coupling for the transmission of fluid under pressure from one member to another wherein said members are relatively rotatable.

In the present case, the fluid coupling is operative to transmit fluid under pressure from the turntable of a self-slewing crane or like equipment to the crawler or truck base thereof to operate the steering or other control mechanism disposed in said crawler or in the truck. In such equipment, the turntable, together with the boom, and the cab mounted thereon, are designed to swing about a vertical axis, and said fluid couplings usually include coupling members which are respectively fixedly mounted relative to the turntable and the crawler or truck. Therefore, there must be provided a packed swivel connection between said members in order to achieve transmission of fluid under pressure through the coupling in all rotary positions of the turntable with respect to the crawler or the truck frame.

In prior fluid couplings of this general type, a plurality of vertically disposed tubes are connected at their opposite ends to a pair of heads, the bottom head being fixedly mounted in the crawler or truck and being provided with ports communicating with respective tubes with conduits leading to the power steering or like mechanism; and the top head or core being provided with ports communicating with the respective tubes and being rotatably fitted within a swivel body, the latter being fixedly mounted to the turntable and having ports to which valve-controlled fluid pressure supply lines are connected to communicate each supply line with ports in said top head at all rotary positions of the swivel body with respect to the top head. Because the swivel joint between said swivel body and the top head of the coupling member fitted therein must include several packing rings to preclude internal and external leakage of fluid, there is substantial torque transmitted from the swivel body to said coupling member as a result of the rotation of the turntable on the crawler or truck. As a consequence, prior inventors have found it necessary to provide a so-called "mother" tube which surrounds said plurality of tubes and is secured at its ends to said top and bottom heads so that such torque is transmitted by it rather than by the plurality of tubes. In some instances, the space between the mother tube and the tube or tubes therewithin has been employed to conduct fluid under pressure from the top head to the bottom head.

It is one primary object of this invention to provide a novel fluid coupling structure in which no such separate relatively large size mother tube is required.

It is another object of this invention to provide a novel coupling member wherein the plurality of tubes extending between said top and bottom heads are secured together as a cluster or bunch and thereby serve as an effective torque resisting element without requiring a separate large size mother tube as aforesaid.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of few of the various ways in which the principles of the invention may be employed.

In said annexed drawing:

Fig. 1 is a side elevation view, partly in cross section, showing the fluid coupling constituting the present invention as disposed centrally within the tubular drive shaft which transmits mechanical power from the turntable to the crawler or truck;

Fig. 2 is a cross-section view of the fluid coupling taken substantially along the line 2—2, Fig. 1;

Fig. 3 is a transverse cross-section view taken substantially along the line 3—3, Fig. 2; and Fig. 4 is a cross-section view in a diametrical plane through the upper end portion of the fluid coupling.

As shown in Fig. 1, there is provided a crawler or truck frame 1 having thereon a bull gear 2 with which a pinion, not shown, of the turntable meshes so that rotation of the pinion causes the turntable to turn with respect to said frame 1 about a vertical axis coinciding with the center axis of said bull gear 2. A portion of the turntable is indicated by the reference numeral 3 and as well known to those skilled in the art, the turntable and said frame 1 will be provided with complementary raceways for ball bearings, such bearings often being of relatively large diameter.

Propelling of the crawler or truck, of which the frame 1 is a part, is effected as by means of a tubular drive shaft 4 which has a gear 5 fixed adjacent its upper end which gear is adapted to mesh with a drive pinion on the turntable driven by any suitable form of power means such as a gasoline engine, diesel engine, or the like. A bevel gear 6 is fixed adjacent the lower end of said drive shaft 4 and as is customary, the bevel gear 6 will mesh with drive gearing for propelling the treads of a crawler or the wheels of a truck.

For power steering units or other fluid pressure actuated devices which are associated with the crawler or with the truck, it becomes necessary to transmit fluid under pressure, air for example, from a compressor, not shown, carried on the turntable; and, because the turntable and the crawler or truck rotate relative to one another, the fluid transmission must be effected through a swivel coupling 7 which is co-axial with the tubular mechanical power transmitting shaft 4.

This fluid coupling 7, as herein shown, comprises a swivel body 8 having a series of inlet ports 9, herein four in number, to which valve-controlled fluid pressure supply lines are adapted to be connected. Extending through said body 8 is the core or top cylindrical head 10 of a coupling member 11 and said head 10 has a corresponding number of ports 12 which communicate with the respective inlet ports 9 through the annular spaces 13 between said head 10 and said body 8. Suitable packing assemblies composed for example, of carriers 14 and deformable rubber or rubber-like rings 15 held in assembled relation as by means of snap rings 16. These packing assemblies serve to prevent external leakage of fluid and also internal leakage from one annular space 13 to the others. The packing assemblies are retained in spaced apart relation, as shown, by means of separators 17 and the end plates 18 and 19 secured at opposite ends of said body 8 constitute closures against which the outermost packing assemblies bear. The upper end of said head 10 has a collar 20 pinned thereto so as to retain the swivel body 8 against upward displacement relative to said coupling member 11.

Said top head 10 has parallel axial bores 21 communicating with the respective ports 12 and the lower ends of said bores are counterbored or otherwise formed so as to telescopically receive therein the upper ends of a corresponding number of tubes 23, which tubes may be soldered, braized or otherwise secured in fluid-tight relation to said top head 10. Said tubes 23 immediately adjacent said top head 10 are joined together in longitudinally contacting relation to form a rigid torque resisting cluster or bunch by brazing along their longitudinally contacting portions or by spot welding at any desired number of longitudinally spaced joints therealong. The lower ends of tubes 23 are again separated and extend into parallel axial bores 24 of a bottom head 25 for soldering, brazing, or other means of attachment therein. Said bores 24 lead to a corresponding number of radial outlet ports 26 to which the conduits for power steering and/or other fluid pressure operated mechanisms are adapted to be connected.

The bottom head 25 is supported in fixed position relative to the frame 1 as by means of a suitable clamp bar 27, and a split type bushing 28 around said bottom head 25 provides a journal for the tubular drive shaft 4. The top head 10 may have a similar bushing 29 which journals the turntable relative to the top head 10 and crawler or truck frame 1.

The fluid coupling herein, therefore, has by reason of the novel tube cluster composed of a plurality of tubes secured to one another longitudinally thereof provided the requisite torque resistance without requiring a so-called "mother" tube as has been found necessary in prior art structures. Although the present fluid coupling has been designed for use with four fluid pressure supply lines, the number of supply lines may be varied and may be either fewer than or greater than four such as, for example, two which is all that is required when only a power steering mechanism is to be actuated. When the fluid coupling only has two tubes in a cluster, the torque resistance thereof will be somewhat less than the four-tube coupling herein illustrated, but it is to be noted that in a two-tube coupling, only three packing assemblies are required between the swivel body and the top head, whereby the torque transmitted through the coupling is correspondingly less than in the four-tube coupling which requires five such packing assemblies. Similarly, a fluid coupling for five, six, or more fluid pressure lines will have a correspondingly greater torque resistance in the cluster of that many tubes so as to be able to withstand the greater torque transmitted through the correspondingly greater number of packings in the swivel joint.

For lack of an accurate generic term for welding or brazing, the tubes are stated in the claims hereof as being welded together.

Other modes of applying the principle of the invention may be employed, change being made as regards the details described, provided the features stated in any of the following claims, or the equivalent of such, be employed.

I therefore particularly point out and distinctly claim as my invention:

1. In a fluid coupling, the combination of a cluster of several circular cross-section parallel tubes secured together longitudinally thereof by welding so that each tube is secured longitudinally along two adjacent tubes, said tubes having parallel, spaced-apart end portions, and heads at opposite ends of said cluster of tubes provided with parallel passages in which the respective end portions of said tubes are secured, said cluster of tubes constituting the sole torque-resisting means to effectively resist relative rotation between said heads.

2. In a fluid coupling, the combination of a cluster of several circular cross-section parallel tubes secured together longitudinally thereof by welding so that each tube is secured longitudinally along two adjacent tubes, said tubes having, at least at one end thereof, parallel spaced-apart end portions, and a head at such one end of said cluster of tubes provided with parallel passages in which such end portions are fitted and secured, said cluster of tubes constituting the sole torque-resisting means to effectively resist rotation of said head with respect to the other end of said cluster of tubes.

References Cited in the file of this patent
UNITED STATES PATENTS

| | | |
|---|---|---|
| 1,891,670 | Ernst | Dec. 20, 1932 |
| 2,119,451 | Turner | May 31, 1938 |
| 2,254,192 | White | Aug. 26, 1941 |
| 2,458,343 | Carleton | Jan. 4, 1949 |
| 2,662,785 | Fawick | Dec. 15, 1953 |